United States Patent
Kular et al.

(10) Patent No.: US 6,624,351 B2
(45) Date of Patent: Sep. 23, 2003

(54) FOLDING PHOTOVOLTAIC STRIP DEVICE

(75) Inventors: Andrew C. Kular, Riverside, NJ (US); Francis W. Lemon, Ottawa (CA)

(73) Assignee: Ecosol Solar Technologies Ltd. (USA), Trenton, NJ (US)

( * ) Notice: Subject to any disclaimer, the term of this patent is extended or adjusted under 35 U.S.C. 154(b) by 0 days.

(21) Appl. No.: 10/010,425

(22) Filed: Nov. 8, 2001

(65) Prior Publication Data

US 2002/0074033 A1 Jun. 20, 2002

(51) Int. Cl.⁷ .............................. H01L 31/045
(52) U.S. Cl. ............... 136/245; 136/244; 136/251; 136/291; 136/293; 257/433; 257/443
(58) Field of Search ................. 136/244, 245, 136/251, 291, 293; 257/433, 443

(56) References Cited

U.S. PATENT DOCUMENTS

| | | | | |
|---|---|---|---|---|
| 3,627,585 A | * | 12/1971 | Dollery et al. | 136/245 |
| 3,677,508 A | * | 7/1972 | Dillard et al. | 244/173 |
| 4,652,693 A | * | 3/1987 | Bar-On | 136/251 |
| 5,296,044 A | * | 3/1994 | Harvey et al. | 136/245 |
| 5,605,769 A | | 2/1997 | Toms | 136/245 |
| 2003/0066556 A1 | * | 4/2003 | Kular | 136/251 |

FOREIGN PATENT DOCUMENTS

| | | | |
|---|---|---|---|
| DE | 20008441 U1 | * | 7/2000 |
| GB | 2003383 A | * | 3/1979 |
| GB | 2250084 A | * | 5/1992 |
| JP | 63-117472 A | * | 5/1988 |

OTHER PUBLICATIONS

"Lightweight, Flexible, Monolithic Thin–Film Amorphous Silicon Modules on Continuous Polymer Substrates", D. Grimmer, F. Jeffrey, S. Martens and M. Thomas, Iowa Thin Film Technologies, Inc., Ames, IA 50010 USA; V. Dalal, M. Noack and H. Shanks, Iowa State University, Ames, IA 50011 USA (Received Mar. 22, 1995; in final form Sep. 20, 1995, published 1996).

* cited by examiner

Primary Examiner—Alan Diamond
(74) Attorney, Agent, or Firm—Woodbridge & Associates, PC; Richard C. Woodbridge, Esq.; Thomas J. Onka, Esq.

(57) ABSTRACT

A folding photovoltaic strip device is provided comprising a plurality of photovoltaic modules joined to form a strip and pleated by flexible, transverse creases so that the device may be stored folded together along the creases, in a compact form, and the creases sprung opened to expose the modules to energizing light. The creases are permanent to facilitate folding the device for storage, and the ends of the strip may be attached to a casing and a lid in which the strip is to be stored.

2 Claims, 2 Drawing Sheets

US 6,624,351 B2

1

FOLDING PHOTOVOLTAIC STRIP DEVICE

FIELD OF THE INVENTION

This invention relates to a folding photovoltaic strip device.

BACKGROUND OF THE INVENTION

It has already been proposed in Japanese Publication No. JP363117472A, publication date May 21, 1998, "Portable Solar Bell Power Source", N. Yanagihara and Z. Ito, to provide a power source by winding a long, flexible, thin film solar cell onto a winding shaft and store the wound film in a package.

It has been proposed in U.S. Pat. No. 5,605,769 dated Feb. 25, 1997, "Method and apparatus for supplying electrical energy to battery powered equipment", D. J. Toms, wherein electrical energy is supplied to, for example, a rechargeable battery by unfurling, i.e. unwinding, a flexible, light converting to electrical energy, strip of photovoltaic cells to form a flat surface for exposure to light.

While these devices are useful, there is a draw back in that, i) if the light converting strip is bent to be coiled, to a radius less than 1 inch (2.54 cm) for storage, performance degradation of the strip in the conversion of light will possibly occur, see, for example, "Lightweight, Flexible, Monolithic Thin—Film Amorphous Silicon Modules on Continuous Polymer Substrates", D. Grimmer, F. Jeffrey, S. Martens and M. Thomas, J. Solar Energy, 1996, Vol. 18, page 210, last paragraph;

ii) a light converting strip at minimum coiling diameter of 2 inches (5.08 cm) is unduly bulky; and, iii) bending the whole lengths of the photovoltaic cells cause bending stresses at easily damage portions of them, such as, for example, bus bars, each time the cells are coiled or uncoiled.

There is a need for a photovoltaic strip device which, when stores, is not subjected to bending damage by being furled or coiled, which is capable of being stored in a compact manner, and which need not have easily damaged portions subjected to damaging bending stresses each time the strip is coiled or uncoiled.

SUMMARY OF THE INVENTION

According to the present invention, there is provided a folding photovoltaic strip device, comprising:

a. a plurality of photovoltaic modules, b. a support with the modules spaced therealong and adhering thereto to form a strip with exposed portions of the support between the modules, and wherein, c. at least some of the exposed portions of the support are pleated by transversely extending flexible, permanent creases to form a series of panels wherein the creases will spring open, whereby i. with the panels folded together in a concertina manner, by means of the creases, the device is stored in a retracted, compact form and, ii. with the panels spread out by means of the creases being sprung open, the modules can be exposed to light that is convertible by the modules to electrical energy.

The panels may be essentially flat.

2

The flexible creases may be at intermediate positions across modules.

Each module may be provided with a flexible crease.

The flexible creases may be spaced at a module length apart from one another.

The flexible creases may be spaced with at least one module between each pair of them.

The device may include diode electrically connected to the device and through which an article may be electrically energized by the device.

The flexible creases are preferably permanent creases.

Preferably, the permanent creases are open creases that, in the relaxed state, expose the modules to light, and, the strip has sufficient stiffness to be compressed to the retracted, compact form.

BRIEF DESCRIPTION OF THE DRAWINGS

In the accompanying drawings which illustrate, by way of example, embodiments of the present invention.

DETAILED DESCRIPTION OF PREFERRED EMBODIMENT

Figure 1:
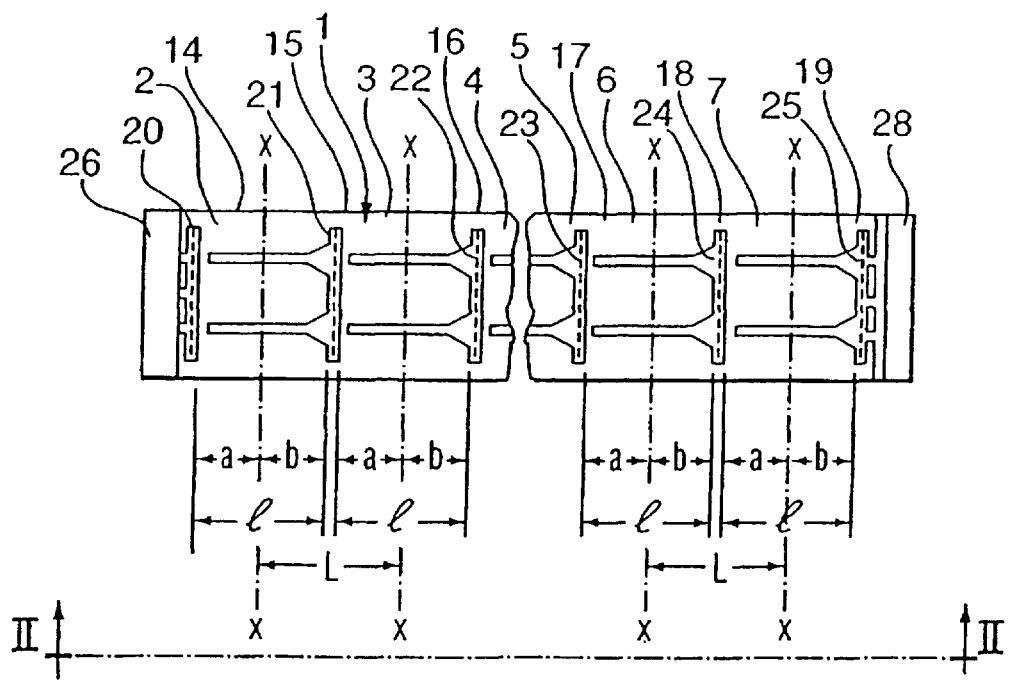
FIG. 1 is a plain view of unfolded end portions of a photovoltaic strip device.
Figure 2:
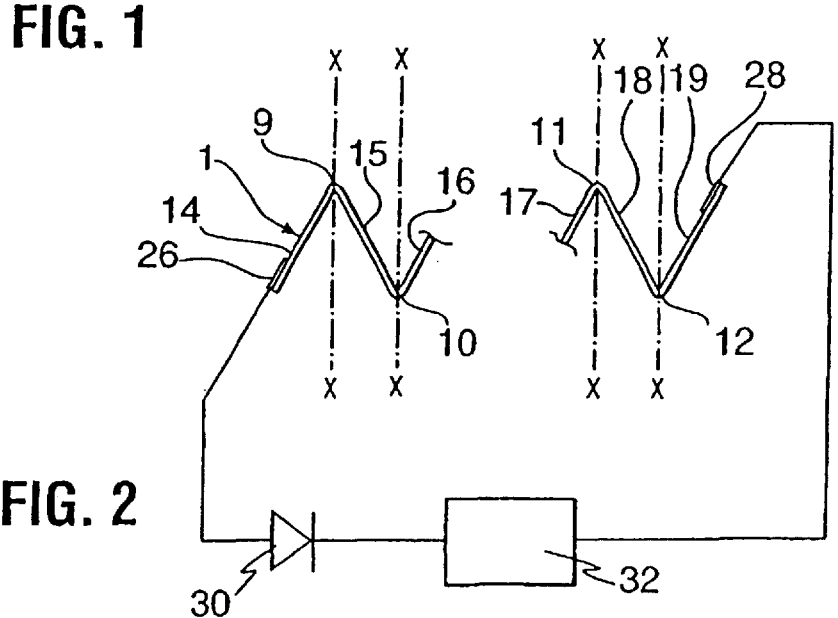
FIG. 2 is a side view in the direction II—II, FIG. 1, with the portions of the strip pleated by creases and the creases partially opened, and electrically connected to an electrical power consuming device.
Figure 3:
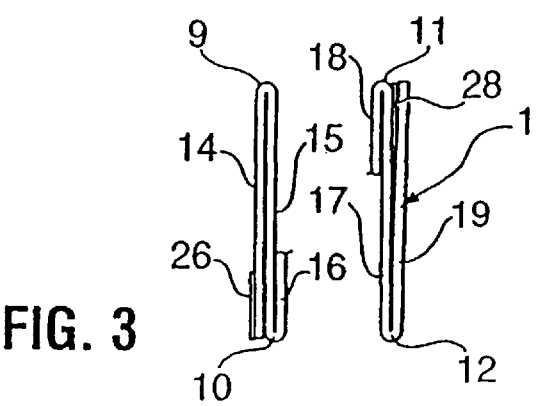
FIG. 3 is an enlarged side view in the direction II—II, FIG. 1, with the portions of the strip pleated in the completed folded state.

Referring now to FIGS. 1 to 3, there is shown end portions of a folding photovoltaic strip device 1, comprising a) a plurality of photovoltaic modules, some of which are shown and designated 2 to 7, joined to form the strip 1, and wherein, b) the strip is pleated, as shown in FIGS. 2 and 3, with transversely extending, flexible creases 9 to 12, along lines XX, FIGS. 1 and 2, to form a series of panels 14 to 19, some of which are shown and designated 14 to 19, whereby, i) with the panels 14 to 19 folded together in a concertina-like manner, as shown in FIG. 3, by means of the creases, such as creases 9 to 12, the device 1 is stored in a retracted, compact concertina form, and, ii) with the panels 14 to 19 spread out, as shown in FIG. 1, by means of the crease, such as these designated 9 to 12, the modules, such as those designated 2 to 7, can be exposed to light that is convertible by the modules 2 to 7 to electrical energy.

It would be appreciated that the photovoltaic modules between the end portions shown in FIG. 1 are identical to those shown in the end portions.

In this embodiment, the photovoltaic modules 2 to 7 are of a known type which is described in "Lightweight Flexible, Monolithic Thin-Film Amorphous Silicon Modules on Continuous Polymer Substrates", D. Grimmer, F. Jeffrey, S. Martens and M. Thomas, J. Solar Energy, 1996, Vol. 18, pages 205–212.

In order to provide the flexible creases 9 to 12, which facilitates closing the modules 2 to 7 at these positions, the modules 2 to 7 may be folded along lines XX and then pressed together using non-destructive heating to produce permanent flexible creases 9 to 12.

Referring to FIG. 1, the positions of the lines XX, for the flexible creases 9 to 12 are chosen not to damage the modules 2 to 7, that is, for example, not to lie along electrical interconnecting shunts 20 to 25 or bus bars 26 and 28.

In this embodiment, the lines XX for the flexible creases 9 to 12 are positioned equidistant between the shunts 20 to 25, that is a=b and a+b=L. This means that a module length L exists between each part of lines XX.

In other embodiments it may be found that, to void damage to the modules 2 to 7, a>b or a<b, even so, a+b=L.

In yet other embodiments of the present invention, where for example, the device 1 is to be stored in an existing casing which is too small to accept the full length L of the modules 2 to 7, each length L is made a fraction, for example, ⅞ of the length of the module 2 to 7, in this case, the position of each subsequent line XX will be displaced ⅛ further back on the module 2 to 7 from the previous one.

In other embodiments of the present invention, each length L extends from one module, over at the whole length of at least one following module, to a portion of the next module.

In FIG. 2, the photovoltaic device 1 is shown electrically connected through a diode 30 to energize an article 32, when the modules 2 to 7 are exposed to an electrical energy producing form of light by opening the flexible crease 9 to 12 to expose the modules 2 to 7 thereto.

In other embodiments of the present invention, the device 1 when stored in the retracted form, may be curved to some extent to suit a particular casing in which it is to be stored. Thus, in these patent specifications "essentially flat" includes being longitudinally curved to some extent, but no sufficiently as to be wrapped which could damage the modules 2 to 7.

One end of the device 1 may be secured to a casing within which the device 1 is to be stored, while the other end of the device 1 may be secured to a removable cover for enclosing the device in the casing.

The device 1 may be used to charge or recharge a rechargeable storage cell or battery, such as, for example, those referred to as alkaline, nickel-metal-hydride, lithium-ion, aluminum-air, nickel-cadmium, lead-acid, or supercapasitor. It will be appreciated that, because the device is not wound round the cell or battery, as in the prior art, standard sized cells or batteries available over the counter, may be charged or recharged by devices according to the present invention. This is a significant advantage over the devices taught in U.S. Pat. No. 5,605,769, dated Feb. 25, 1997, where, as stated in the patent specification, the outside diameter of a conventional cell or battery has to be reduced to accommodate the device wound therearound.

It will be appreciated that the modules 2 need not be flexible because all that is required is that the creases be sufficiently flexible and for the panels 14 to 19 to be capable of being folded together in a compact manner.

The flexible creases are preferably permanent creases because this enables the panels to be folded together in a much easier manner.

If the device 1 is too stiff at the line XX, where the creases are to be made, then increased flexibility may be imparted to the strip 1 at these positions by making weak joints at them. The weak joints may be made by, for example, thinning the strip 1 at these positions and/or providing slits in the strip 1 at these positions.

The flexible creases may set the strip 1 with the creases opened to some extent, as shown in FIG. 2. The creases may then be held sprung or compressed together for storage, provided that strip 1 has enough stiffness to do this. Thus, the strip 1 may be arranged so that, in the relaxed, open position, the modules are opened sufficiently for exposure to light to be converted to electrical energy.

Figure 4:
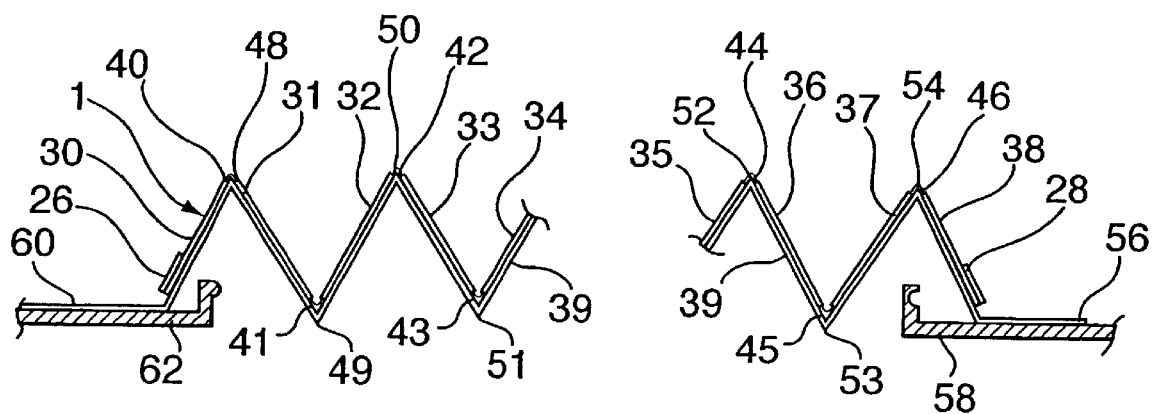
FIG. 4 is an enlarged similar view of FIG. 2, but a different embodiment, and party section.

In FIG. 4, similar parts to those shown in FIGS. 1 to 3 are designated by the same reference numerals, and the previous description is relied upon to describe them In FIG. 4, modules 30 to 38 are spaced apart along, and adhere to, a support 39 with exposed portions 40 to 46 of the support 39 between the modules 30 to 38. The support 39 has flexible, permanent creases 48 to 54 in the exposed portions 40 to 46, which spring open to expose the modules 30 to 38 to light. One end designated 56 of the support 39 is secured to a casing, a portion of which is shown and designated 58, and within which the device 1 is to be stored in the retracted, compact form. The other end designated 60 of the support 39 is secured to a lid, a portion of which is shown and designated 62, for closing the device 1 in the casing 58.

In other embodiments of the present invention, where the casing 58 is used to store a rechargeable cell or battery, at least a portion of device 1 is to be used in an existing casing that was not designed to accommodate it.

What is claimed is:

1. A folding photovoltaic strip device, comprising:
   a. a plurality of photovoltaic modules,
   b. a support with the modules spaced therealong and adhering thereto to form a strip with exposed portions of the support between the modules, and wherein,
   c. at least some of the exposed portions of the support are pleated with transversely extending flexible, permanent creases to form a series of panels wherein the creases will spring open, whereby,
      i. with the panels folded together in a concertina manner, by means of the creases, the device is stored in a retracted, compact form and,
      ii. with the panels spread out by means of the creases being sprung open, the modules can be exposed to light that is convertible by the modules to electrical energy.
2. A device according to claim 1, further comprising,
   d. a casing for the strip, and to which a first end of the strip is attached, and,
   e. a lid for closing the spring openable creases, the strip in the casing, and to which a second end of the strip is attached.

* * * * *